J. GUERRERO.
VEHICLE WHEEL.
APPLICATION FILED DEC. 26, 1911.

1,073,040.

Patented Sept. 9, 1913.

Witnesses:

Inventor
Jorge Guerrero

J. GUERRERO.
VEHICLE WHEEL.
APPLICATION FILED DEC. 26, 1911.

1,073,040.

Patented Sept. 9, 1913.
2 SHEETS—SHEET 2.

UNITED STATES PATENT OFFICE.

JORGE GUERRERO, OF PARIS, FRANCE.

VEHICLE-WHEEL.

1,073,040.      Specification of Letters Patent.      Patented Sept. 9, 1913.

Application filed December 26, 1911. Serial No. 667,892.

*To all whom it may concern:*

Be it known that I, JORGE GUERRERO, a citizen of the Republic of Argentina, residing at 7 Rue Georges-Ville, Paris, France, have invented certain new and useful Improvements in Vehicle-Wheels; and I do hereby declare the following to be a full, clear, and exact description of the invention, such as will enable others skilled in the art to which it appertains to make and use the same.

The present invention has reference to vehicle wheels, and it comprehends, briefly, certain improvements, hereinafter specified at length, in or relating to the construction of the rim of the wheel and the devices employed for supporting the tire in place therein, to increase the resiliency of the wheel.

Figure 1:
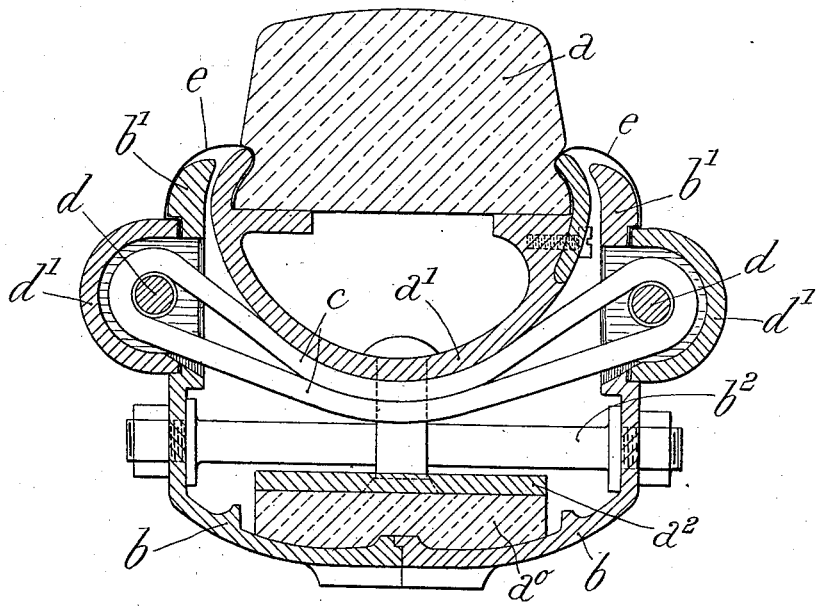
Figure 2:
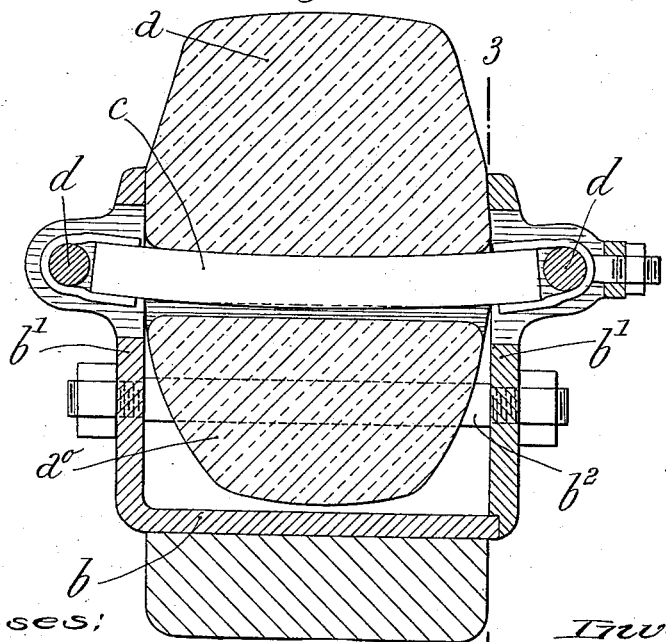
Figure 3:
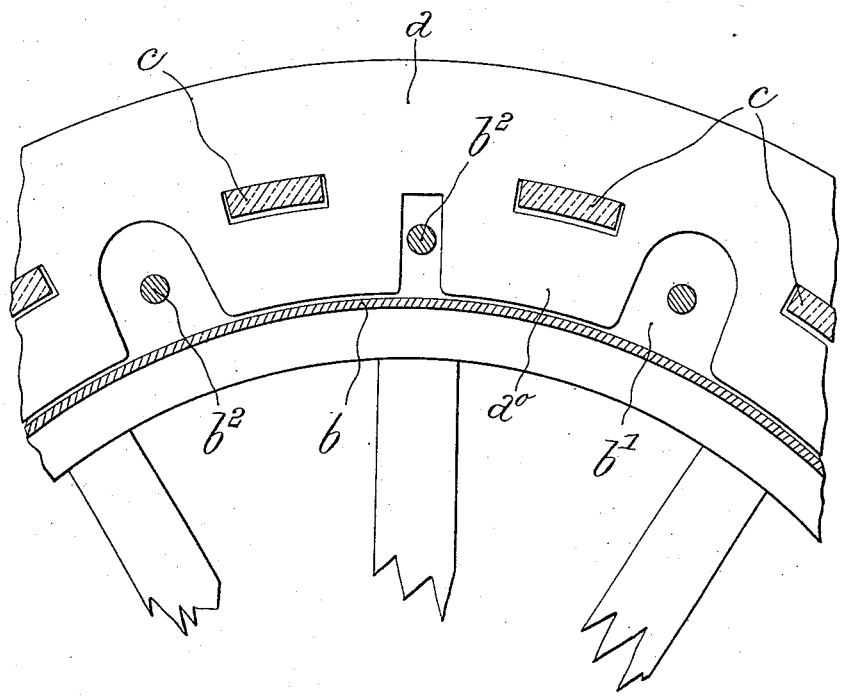

An embodiment of the invention is illustrated in the accompanying drawings, whereof:

Figure 1 is a transverse section taken through the rim of the improved wheel; Fig. 2 is a similar view of a modification; and Fig. 3 is a section on the line 3—3 of Fig. 2.

Referring to said drawing, $a$ indicates, generally, the solid tire of the wheel, and $b$ the hollow or trough-shaped rim. The side walls or cheek-pieces $b^1$ of the latter element are connected by transverse bolts $b^2$ that serve to fasten together the two sections, parts or members of which the rim is preferably composed.

To increase the resiliency of the wheel, the tire $a$ is so mounted between the aforesaid cheek-pieces $b^1$ as to be capable of movement in a vertical plane, being carried for this purpose by suitable supporting devices $c$ that are disposed transversely of the rim, are structurally separate of one another and are themselves connected to the cheek-pieces. These supporting devices may be made of any desired material, as, for example, rubber or other elastic substance, or steel, and they may be in the form of endless loops, as shown in Fig. 1, or of single bands, strips, or strands, as shown in Fig. 2, as many of the devices being used as may be required. They are engaged at opposite ends with supporting pins $d$, or the like, which are mounted on outwardly extending projections with which the cheek-pieces are provided.

In the loop construction represented in Fig. 1, the supporting pins $d$ are fastened to small hollow bosses $d^1$, which fit in openings in the cheek-pieces and are held in place by the tension of the loops, the latter being somewhat stretched consequent upon their application to the rim. Where these loops are employed, the tire $a$ is preferably mounted directly upon a supplemental rim $a^1$, which is of continuous and annular form and is disposed between the cheek-pieces but is free of positive connection therewith, said rim resting directly upon the loops. With this form, it is also preferable to provide means for excluding dirt and other foreign matter from the interior of the main rim $b$; such means consisting of suitable guards $e$ that bridge the spaces between the adjacent edges of the two rims $b$ and $a^1$, as shown in Fig. 1, and extend inwardly over and around the edges of the latter rim.

When single bands are used, they are passed through transverse openings formed in the tire and are provided at their ends with yokes that straddle the pin $d$. To adjust the tension of the bands, one of the pins may be threaded and passed through a threaded perforation in the adjacent cheek-piece, to permit its manipulation.

While the construction just described is satisfactory for general purposes, it is advisable, where the wheel is apt to be subjected to very severe stresses or strains, to provide a supplemental elastic cushion $a^\circ$, so constructed and arranged as to assist the main cushioning devices $c$. In the first form of the invention, the cushion $a^\circ$ is constituted by a relatively thick annular band or ring of rubber, which encircles and directly engages the bottom wall of the main rim $b$ and is connected with the supplemental rim $a^1$ by a series of feet or plates $a^2$, said feet resting upon the said ring, as shown in Fig. 1. Where the modified or second construction is followed, the cushion is constituted by inwardly extending projections formed upon the tire, the bottoms of these projections being normally out of contact with the bottom of the main rim, and in this form, the connecting bolts $b^2$ pass through the spaces between adjacent projections and do not contact with the faces of said projections or with the bottom face of the tire.

Having fully described my invention, I claim:

1. In a vehicle wheel, the combination, with a trough-shaped rim, and a tire disposed between the cheek-pieces thereof; of a supplemental rim wherein said tire is directly fitted disposed between said cheek-pieces; a series of transversely arranged yielding devices connected at opposite ends to said cheek-pieces; said supplemental rim resting directly upon said devices; a supplemental cushion encircling the bottom wall of the first-named rim; and a series of members connected to said supplemental rim and resting upon said cushion.

2. In a vehicle wheel, the combination, of a trough-shaped rim, and a tire disposed between the cheek-pieces thereof; of a supplemental rim wherein said tire is directly fitted disposed between said cheek-pieces; and a series of transversely arranged elastic loops connected at opposite ends to said cheek-pieces, said supplemental rim resting directly upon said loops.

3. In a vehicle wheel, the combination, with a trough-shaped rim having its cheek-pieces provided with removable bosses, said bosses having pins mounted therein; of a series of transversely arranged elastic loops having their opposite ends engaged with said pins for drawing said bosses toward each other and holding them in place; a supplemental rim disposed between said cheek-pieces and resting directly upon said loops; and a tire fitted in the supplemental rim.

4. In a vehicle wheel, the combination, with a trough-shaped rim having its cheek-pieces provided with outwardly extending projections and with pins mounted in said projections; of a series of elastic devices connected at opposite ends with said pins; a supplemental rim disposed between said cheek-pieces and supported directly upon said devices; a tire fitted in the supplemental rim; an annular cushion encircling the bottom of the first-named rim; and a series of feet connected to said supplemental rim and resting upon said cushion.

In testimony whereof, I affix my signature, in presence of two witnesses.

JORGE GUERRERO.

Witnesses:
H. C. COXE,
PAUL BLUM.

---

Copies of this patent may be obtained for five cents each, by addressing the "Commissioner of Patents, Washington, D. C."